(12) United States Patent
Itoo et al.

(10) Patent No.: US 8,596,406 B2
(45) Date of Patent: Dec. 3, 2013

(54) UTILITY VEHICLE

(75) Inventors: Seiji Itoo, Akashi (JP); Hideaki Kii, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 32 days.

(21) Appl. No.: 13/269,361

(22) Filed: Oct. 7, 2011

(65) Prior Publication Data

US 2013/0087403 A1  Apr. 11, 2013

(51) Int. Cl.
*B60K 11/06* (2006.01)
*F16H 57/04* (2010.01)

(52) U.S. Cl.
USPC ............... 180/339; 474/93; 165/42; 74/606 A (58) Field of Classification Search
USPC ............... 180/269, 339, 68.1, 225, 229, 65.1; 474/13, 144, 93; 165/41, 42, 43; 74/606 A
See application file for complete search history.

(56) References Cited

U.S. PATENT DOCUMENTS

| | | | |
|---|---|---|---|
| 3,766,575 A | 10/1973 | Grengs | |
| 4,697,665 A * | 10/1987 | Eastman et al. | 180/230 |
| 6,510,912 B1 | 1/2003 | Atsuumi | |
| 6,820,708 B2 | 11/2004 | Nakamura | |
| 6,938,676 B2 * | 9/2005 | Lan et al. | 165/41 |
| 7,562,739 B2 * | 7/2009 | Lan et al. | 180/339 |
| 7,717,206 B2 | 5/2010 | Tanaka et al. | |
| 7,882,911 B2 * | 2/2011 | Nobuhira | 180/68.1 |
| 7,967,100 B2 * | 6/2011 | Cover et al. | 180/312 |
| 8,002,061 B2 | 8/2011 | Yamamura et al. | |
| 8,091,670 B2 | 1/2012 | Suzuki et al. | |
| 8,256,563 B2 * | 9/2012 | Suzuki et al. | 180/292 |
| 2002/0134598 A1 * | 9/2002 | Nakamura et al. | 180/68.1 |
| 2003/0066696 A1 * | 4/2003 | Nakamura | 180/68.1 |
| 2004/0195018 A1 | 10/2004 | Inui et al. | |
| 2006/0011401 A1 * | 1/2006 | Nakamura et al. | 180/309 |
| 2006/0270503 A1 * | 11/2006 | Suzuki et al. | 474/144 |
| 2009/0183937 A1 * | 7/2009 | Yamamura et al. | 180/89.2 |
| 2010/0155170 A1 * | 6/2010 | Melvin et al. | 180/339 |
| 2010/0167853 A1 | 7/2010 | Morita | |
| 2011/0048828 A1 * | 3/2011 | Sunsdahl et al. | 180/68.1 |
| 2011/0220429 A1 * | 9/2011 | Yamamura et al. | 180/68.1 |
| 2012/0247846 A1 * | 10/2012 | Ichikawa | 180/65.21 |
| 2012/0289370 A1 * | 11/2012 | Yamanishi et al. | 474/93 |
| 2013/0090199 A1 * | 4/2013 | Itoo et al. | 474/93 |

OTHER PUBLICATIONS

Itoo, Seiji et al., "Belt-Type Continuously Variable Transmission" U.S. Appl. No. 13/267,721, filed Oct. 6, 2011, 28 pages.
Itoo, Seiji et al., "Belt-Type Continuously Variable Transmission" U.S. Appl. No. 13/267,734, filed Oct. 6, 2011, 29 pages.
Itoo, Seiji et al., "Utility Vehicle" U.S. Appl. No. 13/269,341, filed Oct. 7, 2011, 23 pages.

* cited by examiner

*Primary Examiner* — Karen Beck
(74) *Attorney, Agent, or Firm* — Alleman Hall McCoy Russell & Tuttle LLP (57) ABSTRACT

A utility vehicle is provided. The utility vehicle may include a transmission including a transmission mechanism and a transmission case assembly for accommodating the transmission mechanism; and an air discharge duct coupled to the transmission case assembly, to discharge air from inside the transmission case assembly; wherein the air discharge duct includes an upward extending portion extending substantially upward from the transmission case assembly, and a downward extending portion which is bent back at an upper end portion of the upward extending portion, and then extends substantially downward; and the upward extending portion and the downward extending portion partially overlap with each other in at least either a forward and rearward direction or a rightward and leftward direction.

6 Claims, 9 Drawing Sheets

UTILITY VEHICLE

BACKGROUND OF THE INVENTION

1. Field of the Invention

The present invention relates to a utility vehicle capable of driving off-road. In particular, the present invention relates to a utility vehicle having a structure for air-cooling a transmission.

2. Description of the Related Art

United States Patent Application Publication No. 2010/0167853 discloses a utility vehicle having a structure for air-cooling a V-belt-type continuously variable transmission (CVT). The V-belt-type CVT includes a belt transmission mechanism coupled to a crankshaft of an engine via a centrifugal clutch, and a transmission case assembly unitarily coupled to a crankcase. The transmission case assembly includes an air inlet and an air outlet. An air-intake duct is coupled to the air inlet. An air discharge duct is coupled to the air outlet. Outside air is taken into the transmission case assembly via the air intake duct and the air inlet and can cool the V-belt-type CVT. The air is delivered from the transmission case assembly to the air discharge duct via the air outlet and discharged to outside.

The air discharge duct extends rearward substantially horizontally from the rear portion of the transmission case assembly. The rear end portion of the air discharge duct opens below a cargo bed. If the utility vehicle falls into a water puddle or a stream during driving, water may possibly flow into the transmission case assembly via the air discharge duct. In addition, since the air discharge duct is increased in size when viewed from above, it is difficult to ensure a wide space in the vicinity of the V-belt CVT, in particular, for a passenger.

SUMMARY OF THE INVENTION

Accordingly, an object of the present invention is to lessen a possibility of water ingress into a transmission case assembly and lay out an air discharge duct coupled to the transmission case assembly as compactly as possible, when a structure for air-cooling the transmission is incorporated into a utility vehicle.

To achieve the above object, a utility vehicle of the present invention comprises a transmission including a transmission mechanism and a transmission case assembly for accommodating the transmission mechanism; and an air discharge duct coupled to the transmission case assembly, to discharge air from inside the transmission case assembly; wherein the air discharge duct includes an upward extending portion extending substantially upward from the transmission case assembly, and a downward extending portion which is bent back at an upper end portion of the upward extending portion, and then extends substantially downward; and the upward extending portion and the downward extending portion partially overlap with each other in at least either a forward and rearward direction or a rightward and leftward direction.

In accordance with the above configuration, since the air discharge duct includes the upward extending portion extending substantially upward, and the downward extending portion which is bent back at the upper end portion of the upward extending portion and then extends substantially downward, the air discharge duct can be positioned as high as possible. Therefore, even if water flows into the air discharge duct through the lower end portion of the downward extending portion, it is possible to substantially prevent the water from reaching the upper end portion of the downward extending portion. In addition, since the upper end portion of the downward extending portion is bent back in substantially a U-shape and extends continuously with the upper end portion of the upward extending portion, it is possible to substantially prevent the water from reaching the upward extending portion, even if the water reaches the upper end portion of the downward extending portion. Furthermore, since the upward extending portion and the downward extending portion partially overlap with each other in at least either the forward and rearward direction or the rightward and leftward direction, the air discharge duct can be laid out compactly when viewed from above.

The above and further objects, features and advantages of the invention will more fully be apparent from the following detailed description with reference to the accompanying drawings.

DETAILED DESCRIPTION OF THE EMBODIMENTS

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the utility vehicle.

Figure 1:
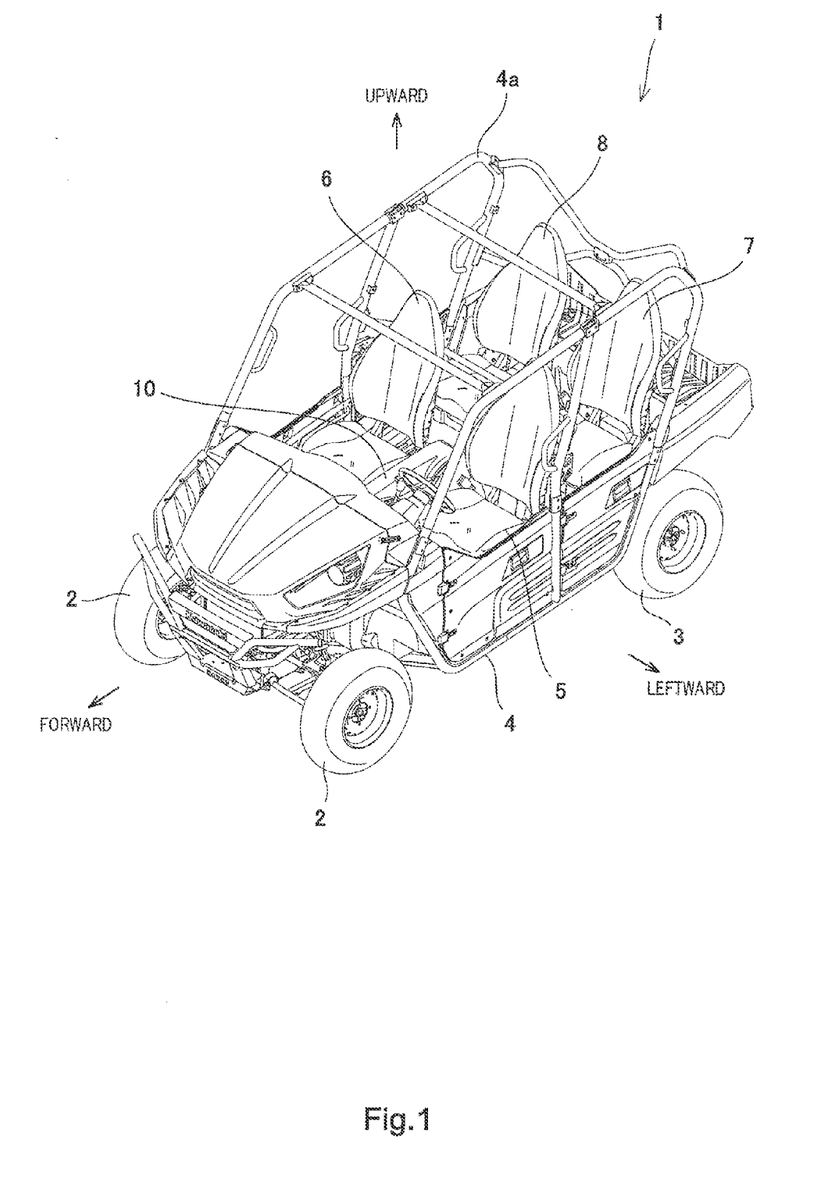
FIG. 1 is a perspective view showing an external appearance of a utility vehicle according to an embodiment of the present invention.

FIG. 1 is a perspective view showing an external appearance of a utility vehicle 1 according to an embodiment of the present invention. Referring to FIG. 1, the utility vehicle 1 is intended for four persons and has four wheels. The utility vehicle 1 has off-road mobility. The utility vehicle 1 includes a pair of right and left front wheels 2, a pair of right and left rear wheels 3, a vehicle body frame 4, a left front seat 5, a right front seat 6, a left rear seat 7, a right rear seat 8, and a console box 10. The front wheels 2 are suspended from the front portion of the vehicle body frame 4, while the rear wheels 3 are suspended from the rear portion of the vehicle body frame 4.

The vehicle body frame 4 has a cabin frame (ROPS) 4a surrounding a cabin for passengers. The left front seat 5 and the right front seat 6 are arranged side by side in a rightward and leftward direction in the front half portion inside the cabin defined by the cabin frame 4a. One of the left front seat 5 and the right front seat 6 is a driver seat 5 and the other is a passenger seat 6. Although the driver seat 5 is located at the left and the passenger seat 6 is located at the right, they may be reversed in the rightward and leftward direction. The left rear seat 7 and the right rear seat 8 are arranged side by side in the rear half portion inside the cabin, and rearward relative to the driver seat 5 and the passenger seat 6, respectively. The console box 10 is provided between the driver seat 5 and the passenger seat 6, and positioned at a substantially center region inside the cabin.

Figure 2A:
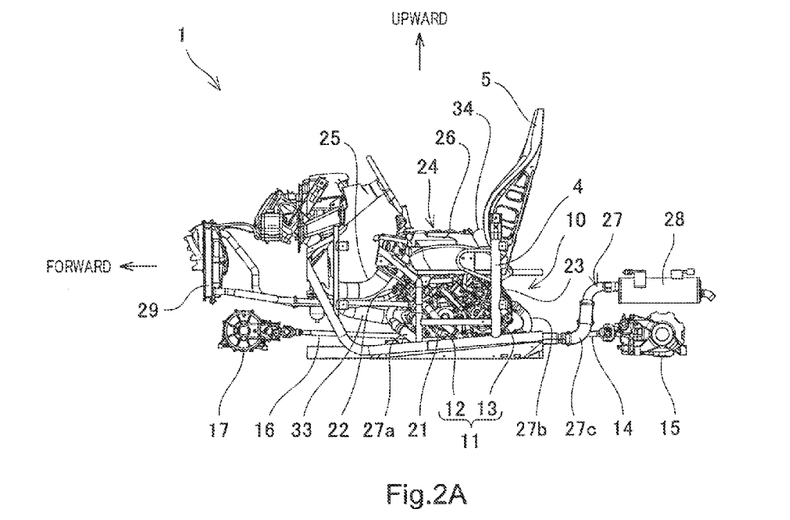
FIG. 2A is a left side view of the utility vehicle, showing a state in which a part of components such as a console box are omitted.
Figure 2B:
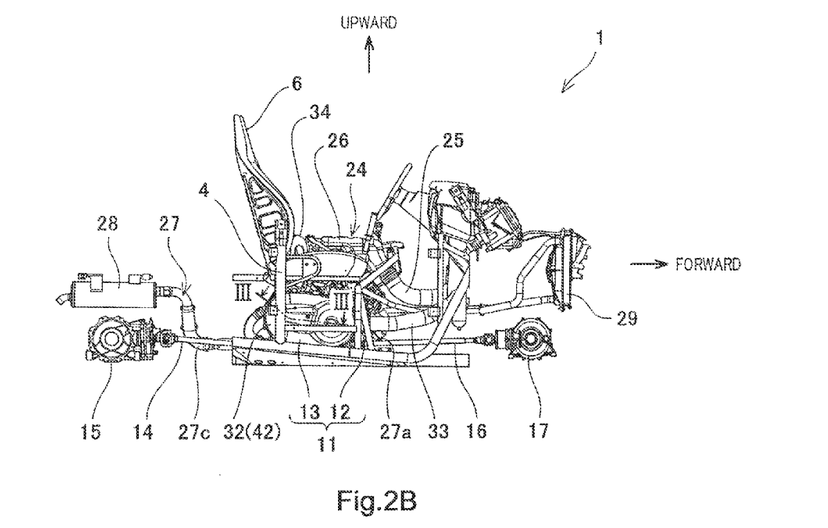
FIG. 2B is a right side view of the utility vehicle, in a state where a part of components such as the console box are omitted.

FIG. 2A is a left side view of the utility vehicle 1, showing a state where a part of components such as the console box are omitted, for the sake of easier explanation. FIG. 2B is a right side view of the utility vehicle 1, showing a state where a part of components such as the console box are omitted, for the sake of easier explanation. As shown in FIGS. 2A and 2B, an engine unit 11 is disposed below the front seats 5 and 6. The engine unit 11 is an assembly including an engine 12 and a transmission 13 which are unitarily coupled together. A driving power of the engine 12 is transmitted to the right and left rear wheels 3 (see FIG. 1) via a rear propeller shaft 14 and a rear differential gear device 15, after its speed is changed by the transmission 13. Depending on the case, the driving power of the engine 12 is also delivered to the right and left front wheels 2 (see FIG. 1) via a front propeller shaft 16 and a front differential gear device 17.

In the present embodiment, the engine 12 is, for example, a four-stroke, V-type two-cylinder, and water-cooled engine. A crankshaft 51 (see FIG. 3) of the engine 12 extends in the substantially right and left direction. The engine 12 includes a crankcase 21 for supporting the crankshaft 51 such that the crankshaft 51 is rotatable, a front cylinder 22 extending forward and upward from the crankcase 21, and a rear cylinder 23 extending rearward and upward from the crankcase 21. The front cylinder 22 and the rear cylinder 23 form a V-shape when viewed from the side.

Although not shown in greater detail, the front cylinder 22 includes a front cylinder block extending forward and upward from the crankcase 21, and a front cylinder head extending forward and upward from the front cylinder block. The rear cylinder 23 includes a rear cylinder block extending rearward and upward from the crankcase 21, and a rear cylinder head extending rearward and upward from the rear cylinder block. In the present embodiment, the front cylinder block includes a reciprocatable single piston and the rear cylinder block includes a reciprocatable single piston.

Above and in front of the engine 12, an air-intake device 24 is disposed. The air-intake device 24 serves to supply intake-air to the engine 12. The air-intake device 24 includes an air-intake pipe 25 and an air-intake chamber 26. The air-intake pipe 25 takes in air from outside and guides the air to the air-intake chamber 26. The air-intake chamber 26 is provided to mitigate a pulsation occurring in the air-intake. As can be seen from FIGS. 2A and 2B, the air-intake chamber 26 is positioned between the left front seat 5 and the right front seat 6, and above the engine 12. The air is supplied from the air-intake chamber 26 to the cylinders 22 and 23 in air-intake strokes of the cylinders 22 and 23.

In FIG. 2A, reference symbol 27 designates an exhaust pipe for guiding exhaust gas exhausted from the engine 12 outside, reference symbol 28 designates a muffler coupled to the exhaust pipe 27, and reference symbol 29 designates a radiator for air-cooling cooling water in the engine 12. The exhaust pipe 27 includes a portion 27a extending from the front wall of the front cylinder head, a portion 27b extending from the rear wall of the rear cylinder head, and a common portion 27c formed by joining the portions 27a and 27b together and extending rearward. The common portion 27c is coupled to the muffler 28. The exhaust pipe 27 is laid out at the left side of the engine 12.

As shown in FIG. 2B, the transmission 13 is disposed at a right side (opposite side of a side where the exhaust pipe 27 is laid out) of the engine 12. The transmission 13 has a transmission case assembly 32 for accommodating a transmission mechanism 31 (see FIG. 3). The utility vehicle 1 incorporates a structure for air-cooling the transmission 13. This air-cooling structure includes an air-intake duct 33 coupled to the transmission case assembly 32 and an air discharge duct 34 coupled to the transmission case assembly 32. The air-intake duct 33 is a duct through which the air is supplied to the transmission case assembly 32, and extends forward from the front portion of the transmission case assembly 32. The air discharge duct 34 is a duct through which the air is discharged from the transmission case assembly 32, and extends substantially upward from the rear upper portion of the transmission case assembly 32. In this air-cooling structure, during driving of the utility vehicle 1, outside air from forward is taken into the air-intake duct 33 and supplied to the interior of the transmission case assembly 32 via the air-intake duct 33. In the interior of the transmission case assembly 32, the air is delivered to the air discharge duct 34 and discharged outside therethrough. During this course, the transmission case assembly 32 and the transmission mechanism 31 (see FIG. 3) accommodated into the transmission case assembly 32 can be cooled by the air.

Figure 3:
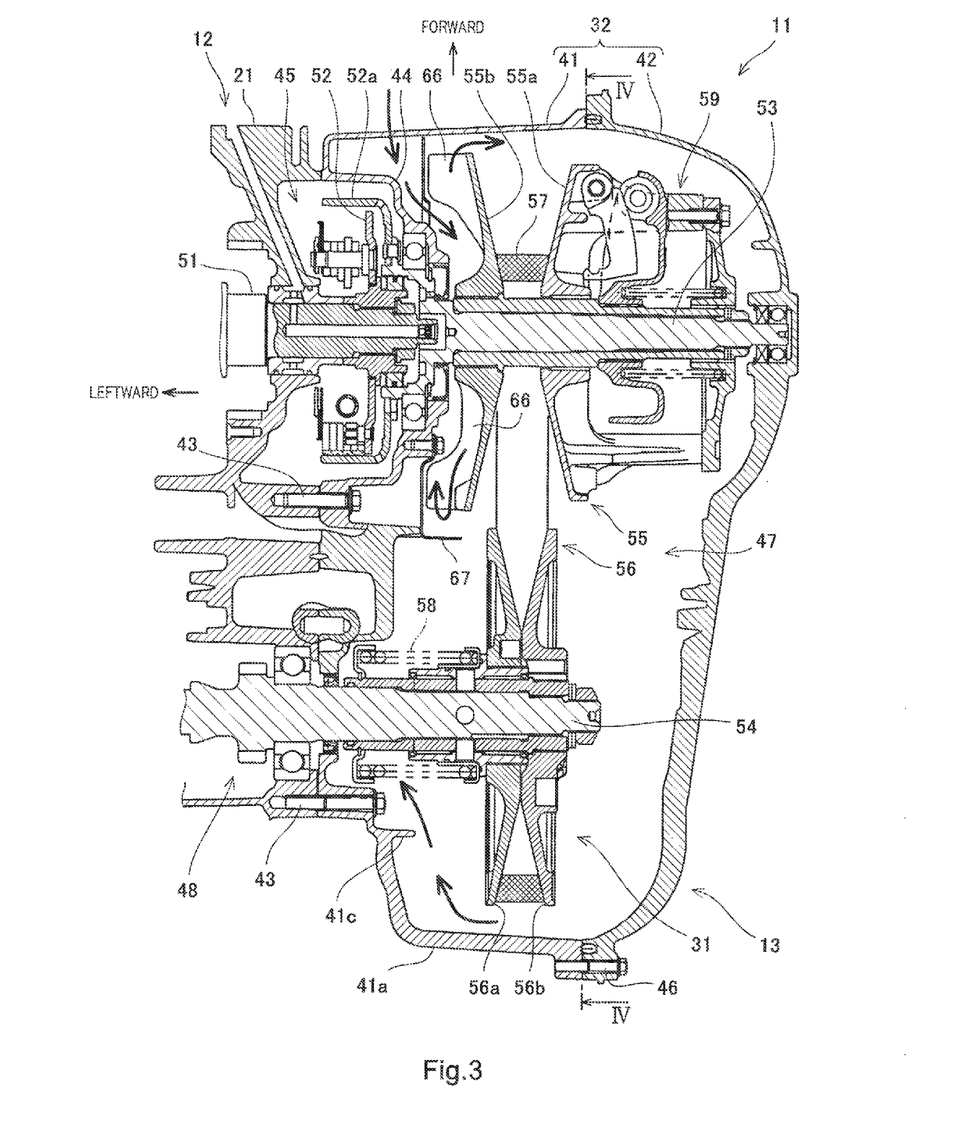
FIG. 3 is a cross-sectional view of a transmission, taken along line III-III of FIG. 2B.

Next, the configuration of the transmission 13 and the flow of the air in the interior of transmission case assembly 32 will be described. FIG. 3 is a cross-sectional view of the transmission 13, taken along line III-III of FIG. 2B. As shown in FIG. 3, the transmission case assembly 32 includes a transmission case body 41 and a transmission cover 42. The transmission case body 41 is joined to the right side wall of the crankcase 21 by means of a plurality of bolts 43. The transmission case body 41 has a clutch cover 44 coupled unitarily to the transmission case body 41. A clutch chamber 45 for accommodating the centrifugal clutch 52 is defined by the inner surface of the clutch cover 44 and the right side wall of the crankcase 21. The transmission cover 42 is joined to a cover mounting surface provided at the left end of the transmission case body 41 by means of a bolt 46. A transmission chamber 47 (i.e., inner space of the transmission case assembly 32) for accommodating the transmission mechanism 31 is defined by the inner surface of the transmission cover 42 and the outer surface of the transmission case body 41. The transmission case body 41 and the transmission cover 42 are manufactured using aluminum or aluminum alloy. This allows the transmission case assembly 32 to have a high stiffness and a high heat radiation property.

The crankshaft 51 is supported by the left side wall and the right side wall of the crankcase 21 such that the crankshaft 51 is rotatable. The right end portion of the crankshaft 51 penetrates the right side wall of the crankcase 21, and is coupled to the centrifugal clutch 52 inside the clutch chamber 45. An output side element 52a of the centrifugal clutch 52 is formed unitarily with a drive shaft 53 of the transmission 13. The drive shaft 53 penetrates the clutch cover 44 and is accommodated into the transmission chamber 47. The rear portion of the crankcase 21 defines a second transmission chamber 48 for accommodating a second transmission (not shown) different from the transmission 13. An input shaft of the second transmission is formed unitarily with a driven shaft 54 of the transmission 13. The driven shaft 54 penetrates the rear portion of the right side wall of the crankcase 21 and is accommodated into the transmission chamber 47.

As described above, the drive shaft 53 of the transmission 13 is coupled to the crankshaft 51 via the centrifugal clutch 52. The drive shaft 53 is provided coaxially with the crankshaft 51 and extends in a substantially rightward and leftward direction. The drive shaft 53 is rotatably supported by the transmission cover 42 and the clutch cover 44. The driven shaft 54 is positioned rearward relative to the drive shaft 53 and extends in parallel with the drive shaft 53. The driven shaft 54 is rotatably supported by the rear portion of the right side wall of the crankcase 21. The transmission mechanism 31 is accommodated into the transmission chamber 47 as described above. The rotation of the crankshaft 51 is transmitted to the drive shaft 53 via the centrifugal clutch 52. The rotation of the drive shaft 53 is transmitted to the driven shaft 54 after its rotational speed is changed according to a transmission ratio set in the transmission mechanism 31. The rotation of the driven shaft 54 is transmitted to the rear propeller shaft 14 (see FIGS. 2A and 2B) via the second transmission.

In the present embodiment, the transmission mechanism 31 is a V-belt transmission mechanism, such as a V-belt-type continuously variable transmission. The transmission mechanism 31 includes a drive pulley assembly 55 mounted to the drive shaft 53, a driven pulley assembly 56 mounted to the driven shaft 54, and a V-belt 57 wrapped around the pulley assemblies 55 and 56. The drive pulley assembly 55 includes a pair of sheaves 55a and 55b which are rotatable integrally with the drive shaft 53 and face each other such that they are closer to and away from each other in the rightward and leftward direction. The V-belt 57 is retained by the sheaves 55a and 55b. The driven pulley assembly 56 includes a pair of sheaves 56a and 56b similar to the sheaves 55a and 55b. In the present embodiment, of the two sheaves 55a and 55b of the drive pulley assembly 55, a left sheave closer to the clutch cover 44 is a fixed sheave 55b and a right sheave is a movable sheave 55a, while of the two sheaves 56a and 56b of the driven pulley assembly 56, a left sheave closer to the crankcase 21 is a movable sheave 56a and a right sheave is a fixed sheave 56b. According to a change in a distance between the sheaves 55a and 55b of the drive pulley assembly 55 in the rightward and leftward direction, a radius of a portion of the V-belt 57 which is wrapped around the drive pulley assembly 55 changes. The same applies to the driven pulley assembly 56. This makes it possible to continuously change the transmission ratio of the transmission mechanism 31. In FIG. 3, reference symbol 59 designates a sheave thrust generating mechanism for applying a thrust for moving the movable sheave 55a toward the fixed sheave 55b, and reference symbol 58 designates a pressure-adjusting spring for biasing the movable sheave 56a toward the fixed sheave 56b.

The transmission case assembly 32 has a certain thickness in the rightward and leftward direction to accommodate the drive shaft 53 extending in the rightward and leftward direction, the driven shaft 54 extending in the rightward and leftward direction, the sheaves 55a and 55b which are configured to be closer to and away from each other in the rightward and leftward direction, and the sheaves 56a and 56b which are configured to be closer to and away from each other in the rightward and leftward direction. The thickness of the transmission case assembly 32 is defined by a peripheral wall protruding to the right side from the crankcase 21 and extending in a closed-loop shape. In the present embodiment, a substantial part, indeed most, of the peripheral wall constituting the transmission case assembly 32 is provided at the transmission case body 41 rather than the transmission cover 42. Because of this, for example, the driven pulley assembly 56 is surrounded by the peripheral wall 41a of the transmission case body 41.

Figure 4:
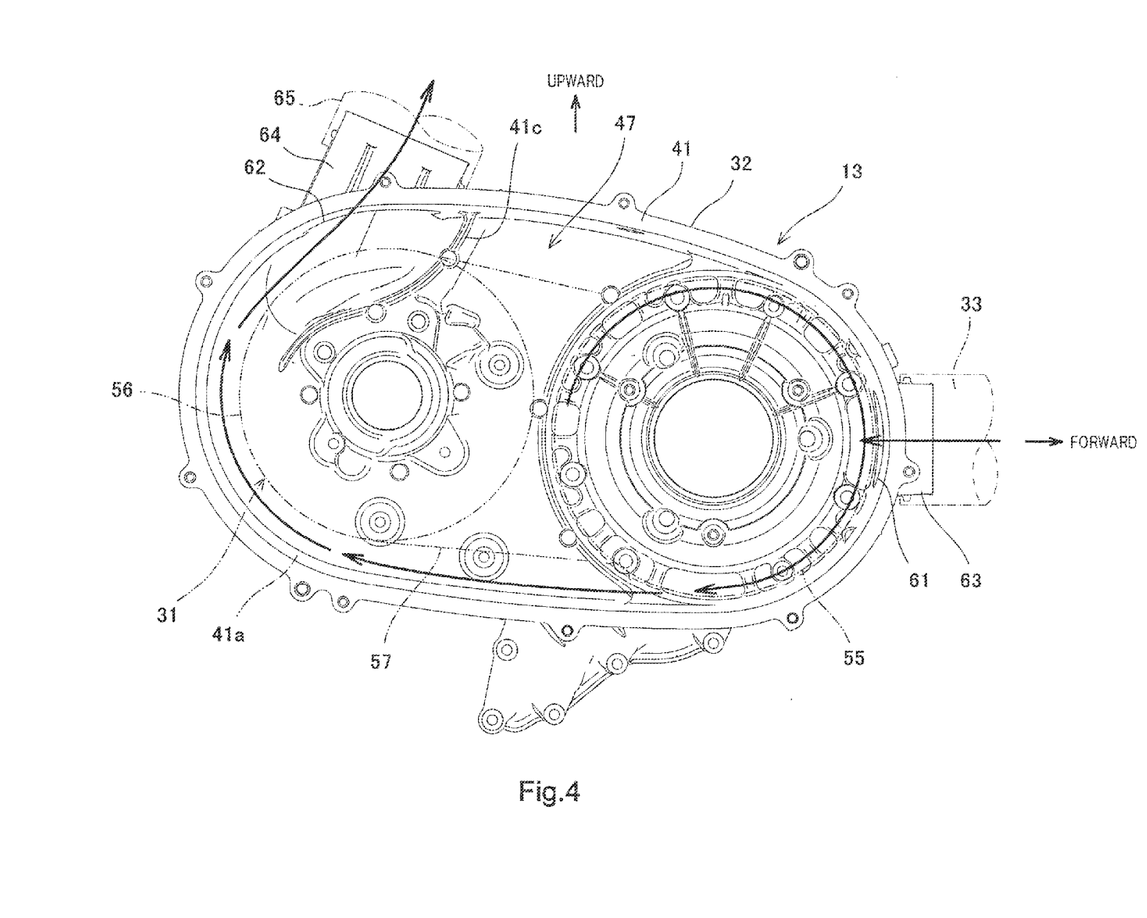
FIG. 4 is a right side view of a transmission case taken along line IV-IV of FIG. 3.

FIG. 4 is a right side view of the transmission case body 41 taken along line IV-IV of FIG. 3. As shown in FIG. 4, a peripheral wall 41a of the transmission case body 41 has an elongated circle shape surrounding an elongated circle defined by the drive pulley assembly 55, the driven pulley assembly 56 and the V-belt 57, so as to have a gap with respect to this elongated circle when viewed from the side. The front portion and the rear portion of the peripheral wall 41a have a substantially semi-circular-arc shape, when viewed from the side.

The transmission case assembly 32 has an air inlet 61 through which the outside air is taken into the transmission case assembly 32, and an air outlet 62 through which the air is discharged from the inside of the transmission case assembly 32. The air inlet 61 and the air outlet 62 are provided on the peripheral wall 41a of the transmission case body 41. A front tubular portion 63 protrudes forward from the front portion of the peripheral wall 41a of the transmission case body 41. The front tubular portion 63 has a substantially cylindrical shape having open ends. The air inlet 61 is formed by the front tubular portion 63. A rear tubular portion 64 protrudes upward from the rear upper portion of the peripheral wall 41a of the transmission case body 41 such that the rear tubular portion 64 is tilted forward. The rear tubular portion 64 has a substantially cylindrical shape having open ends. The air outlet 62 is formed by the rear tubular portion 64.

The air-intake duct 33 is coupled at its downstream end portion to the front tubular portion 63. The air discharge duct 34 (see FIGS. 2A and 2B) is coupled at its upstream end portion to the rear tubular portion 64 via a coupling duct 65. A substantial part, indeed most, of the peripheral wall of the transmission case assembly 32 is provided at the transmission case body 41. Therefore, the front tubular portion 63 protruding forward from the transmission case assembly 32 and the rear tubular portion 64 protruding substantially upward can be mounted to the transmission case body 41 without substantial restriction. In this configuration, during maintenance of the transmission 13, the transmission cover 42 (see FIG. 3) can be detached while keeping a state where the air intake duct 33 and the air discharge duct 34 are coupled to the transmission case body 41 and secured to the vehicle. Therefore, during maintenance of the transmission 13, the transmission case assembly 32 (see FIG. 3) can be disassembled and assembled easily.

Turning back to FIG. 3, the fixed sheave 55b of the drive pulley assembly 55 has fins 66 coupled unitarily to the fixed sheave 55b. The fins 66 are located on a back surface side (i.e., a left side surface or a right side surface of the fixed sheave 55b, which surface is on an opposite side of the surface which faces the movable pulley 55a) of the fixed sheave 55b. Since the fixed sheave 55b is located leftward relative to the movable pulley 55a, the back surface of the fixed sheave 55b is directed to the left, and the fins 66 face the outer surface of the clutch cover 44 in close proximity to the outer surface. A wind blocking plate 67 is mounted to the right surface of the transmission case body 41 to surround the outer periphery of the drive pulley assembly and the outer periphery of the fins 66 over a predetermined range.

The air inlet 61 (see FIG. 4) is disposed to face the centrifugal fan. The air flows into a space of the transmission chamber 47 which is a little leftward and a little forward relative to the fins 66, through the air inlet 61. When the air is flowing into the space in this way, the engine 12 is running, and the drive shaft 53 and the fixed sheave 55b are rotating. According to the rotation of the fixed sheave 55b, the fins 66 are rotated, thereby allowing the fixed sheave 55b and the fins 66 to operate as the centrifugal fan. In the interior of the transmission chamber 47, the air flows such that it is pushed radially outward relative to the fixed sheave 55b, by the action of the centrifugal fan. During this course, the drive pulley assembly 55 is suitably cooled by the air. The air pushed outward flows smoothly forward by the action of the wind blocking plate 67.

Turning back to FIG. 4, the air pushed forward is guided along the inner surface of the peripheral wall of the transmission case assembly 32 so as to flow in a clockwise direction when viewed from the right side. To be more specific, the air is guided so as to flow rearward along the inner surface of the front portion of the peripheral wall and the inner surface of the bottom portion of the peripheral wall. And, the air is guided along the inner surface of the rear portion of the peripheral wall so as to flow in a clockwise direction, in the vicinity of the driven pulley assembly 56. During this course, the driven pulley assembly 56 and the transmission case assembly 32 are suitably cooled by the air.

As described above, the rear tubular portion 64 protrudes upward from the rear upper portion of the transmission case assembly 32 such that the rear tubular portion 64 is tilted forward. The air outlet 62 formed by the rear tubular portion 64 faces the driven pulley assembly 56. Therefore, the air flows while cooling the pulley assemblies 55 and 56 and then is delivered smoothly to the coupling duct 65 through the air outlet 62 and then to the air discharge duct 34 (see FIGS. 2A and 2B). In this way, the air is smoothly discharged from inside the transmission chamber 47. Therefore, it is possible to suppress heat from being accumulated inside the transmission chamber 47, due to the air flowing into the transmission chamber 47 continuously. As shown in FIGS. 3 and 4, the transmission case body 41 has a rib 41c protruding to the right from the rear portion of the right side surface of the transmission case body 41. The rib 41c extends rearward such that it is tilted downward, from a location forward relative to the air outlet 62. Because of this, the air in the vicinity of the air outlet 62 is inhibited from flowing forward, and is guided toward the air outlet 62. This makes it possible to suppress the air from circulating in the interior of the transmission chamber 47, and hence to suitably form an air flow directed toward the air outlet 62.

Figure 5:
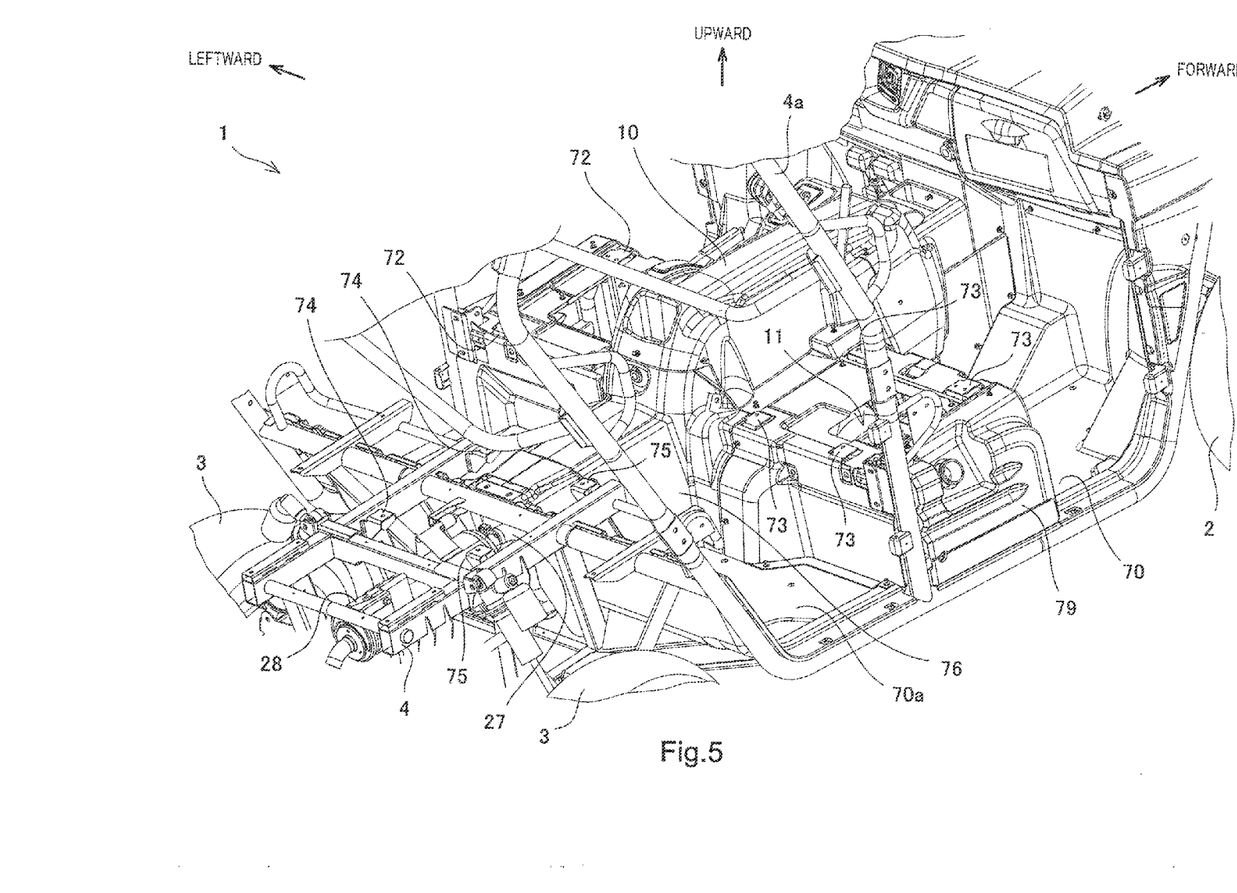
FIG. 5 is a perspective view of the utility vehicle, showing a state in which a part of the components such as seats are omitted.

Next, the structure and layout of the air discharge duct 34 will be described along with components in the vicinity of a space in which the air discharge outlet 34 is laid out. FIG. 5 is a perspective view of the utility vehicle 1, showing a state where a part of the components such as seats are omitted, for the sake of easier explanation. As shown in FIG. 5, the utility vehicle 1 has a floor panel 70 defining a floor for a passenger space. The engine unit 11 is positioned above a center region of the floor panel 70 in the forward and rearward direction, along with a fuel tank 79. The engine unit 11 and the fuel tank 79 are covered from above by a cover member 71 located above the floor panel 70 to extend substantially horizontally.

In FIG. 5, reference symbol 72 designates a plate exposed from the cover member 71. The bottom portion of the driver seat 5 (see FIG. 1) is removably mounted to the plate 72. Reference symbol 73 designates a plate to which the bottom portion of the passenger seat 6 (see FIG. 1) is removably mounted. As can be seen from a positional relationship among the plates 72 and 73, and the console box 10, the console box 10 swells upward from substantially the same position as the position of the bottom portions of the front seats 5 and 6, in a vertical direction, and extends in the forward and rearward direction between the front seats 5 and 6 arranged side by side in the rightward and leftward direction. Reference symbol 74 designates a plate to which the bottom portion of the left rear seat 7 (see FIG. 1) is removably mounted. Reference symbol 75 designates a plate to which the right rear seat 8 (see FIG. 1) is removably mounted. The plates 74 and 75 are mounted to a portion of the vehicle body frame 4 which is positioned above a portion (hereinafter referred to as "rear portion 70a") of the floor panel 70 which is rearward relative to the cover member. A rear portion 70a of the floor panel 70 constitutes a floor on which the feet of passengers seated on the rear seats 7 and 8 are seated are put.

A rear tunnel 76 is provided continuously with the center console in a portion of the rear portion 70a of the floor panel 70, which portion is between the left rear seat 7 and the right rear seat 8. The rear tunnel 76 swells upward from aforesaid portion between the rear seats 7 and 8, and extends rearward from the rear end of the center console 10. The rear tunnel 76 is lower in height than the console box 10. The upper surface of the rear tunnel 76 is lower than the upper surface of the console box 10. At the left side of the engine unit 11, a cooling fan (not shown) is disposed to forcibly air-cool the exhaust pipe 27 (see FIG. 2A) laid out at the left side of the engine unit 11. The air is blown out from this air-cooling fan and blown to the exhaust pipe 27. Then, the air flows into the rear tunnel 76 through the front end thereof, and flows rearward in the interior of the rear tunnel 76.

Figure 6:
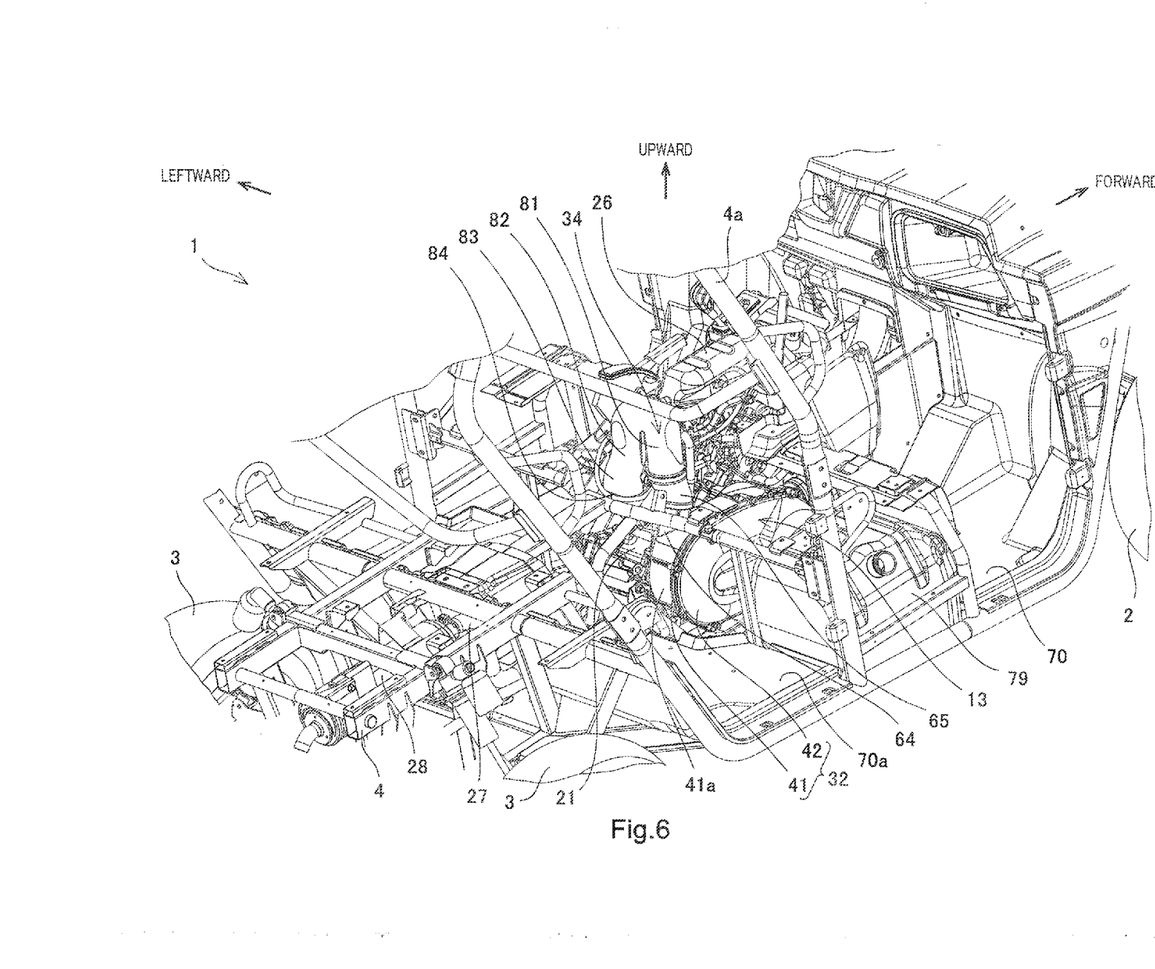
FIG. 6 is a perspective view of the utility vehicle, showing a state in which a part of the components such as the console box are further omitted from FIG. 5.

FIGS. 6 to 9 are a perspective view, a plan view, a right side view and a rear view of the utility vehicle 1, respectively, showing a state in which a part of the components such as the console box are omitted, for the sake of easier explanation. As shown in FIG. 6, the air discharge duct 34 is manufactured from, for example, synthetic resin, and includes an upward extending portion 81 extending substantially upward from the transmission case assembly 32, and a downward extending portion 82 which is bent back at the upper end of the upward extending portion 81 and then extends substantially downward. The lower end portion of the upward extending portion 81 constitutes the upstream end portion of the air discharge duct 34, and is coupled to the rear tubular portion 64 via the coupling duct 65. The lower end portion 83 of the downward extending portion 82 constitutes the downstream end portion of the air discharge duct 34. The lower end portion 83 has an outlet 84 through which the air is discharged after the air has flowed through the air discharge duct 34.

Figure 9:
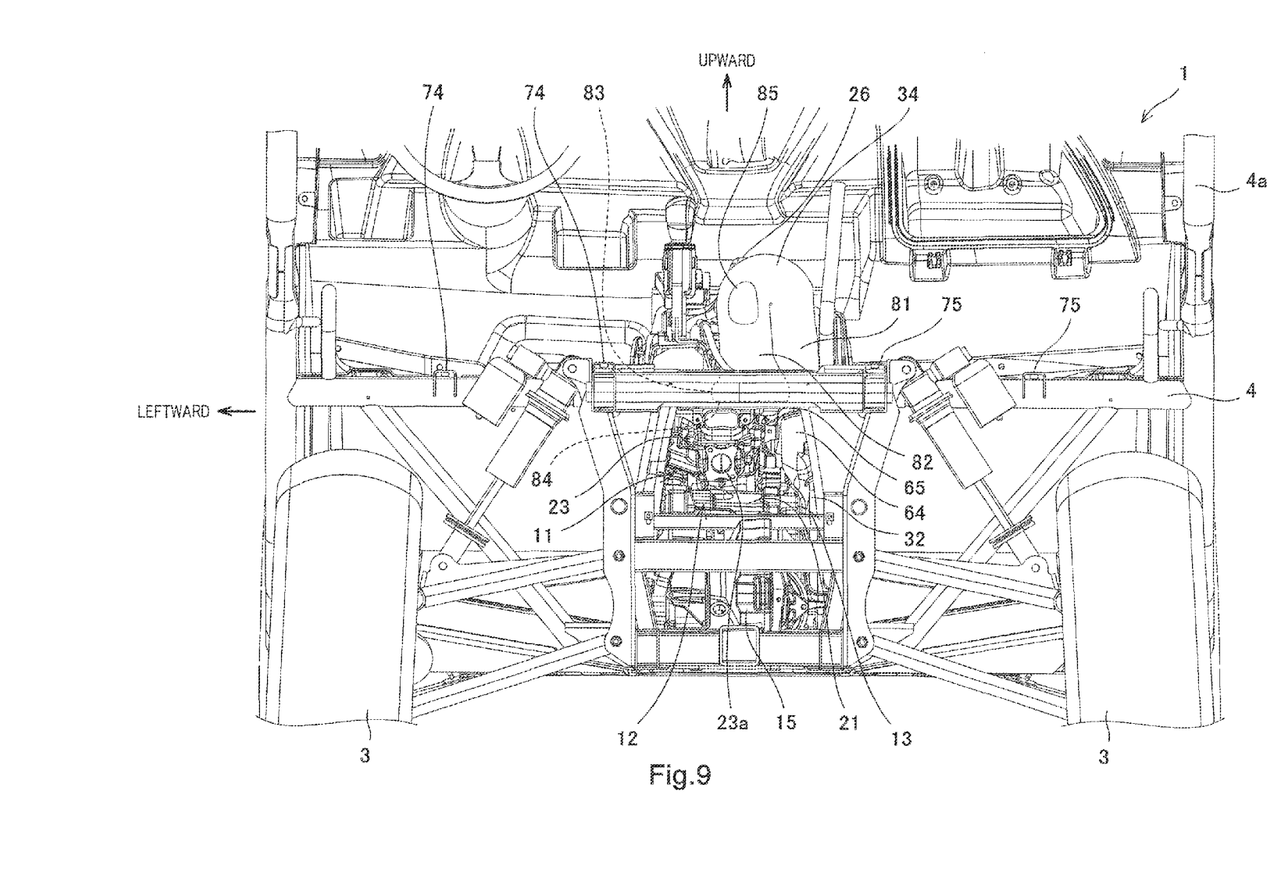
FIG. 9 is a rear view of the utility vehicle, showing a state in which a part of the components such as the console box are omitted.

In FIG. 9, reference symbol 23a designates an opening provided on the rear wall of the rear cylinder head. The upstream end portion of the portion 27b (see FIGS. 2A and 2B) of the exhaust pipe 27 is coupled to the opening. As can be seen from the positional relationship between the opening 23a and the downward extending portion 82, the outlet 84 is positioned above the opening 23a. The outlet 84 is located at the lowermost end of the downward extending portion 82, and therefore, a portion from the upper end portion of the upward extending portion 81 to the upper end portion of the downward extending portion 82 is located above the opening 23a, as a matter of course. In the present embodiment, the uppermost end of the air discharge duct 34 is substantially as high as the uppermost end of the air-intake chamber 26 disposed above the engine 12, and is positioned above the uppermost end of the engine 12.

Since the outlet 84 is provided in a relative high position as described above, it is possible to suppress the water from flowing into the air discharge duct 34 via the outlet 84 even when the utility vehicle 1 is driving over a water puddle or a stream. Even if the water flows through the outlet 84, it is possible to suppress the water from reaching the upper end portion of the downward extending portion 82, because the uppermost end of the air discharge duct 34 is substantially as high as the air-intake chamber 26. In addition, since the upper end portion of the downward extending portion 82 is bent back substantially in a U-shape and is continuous with the upper end portion of the upward extending portion 81, it is possible to suppress the water from reaching the upward extending portion 81 effectively, after the water has reached the upper end portion of the downward extending portion 82.

Figure 8:
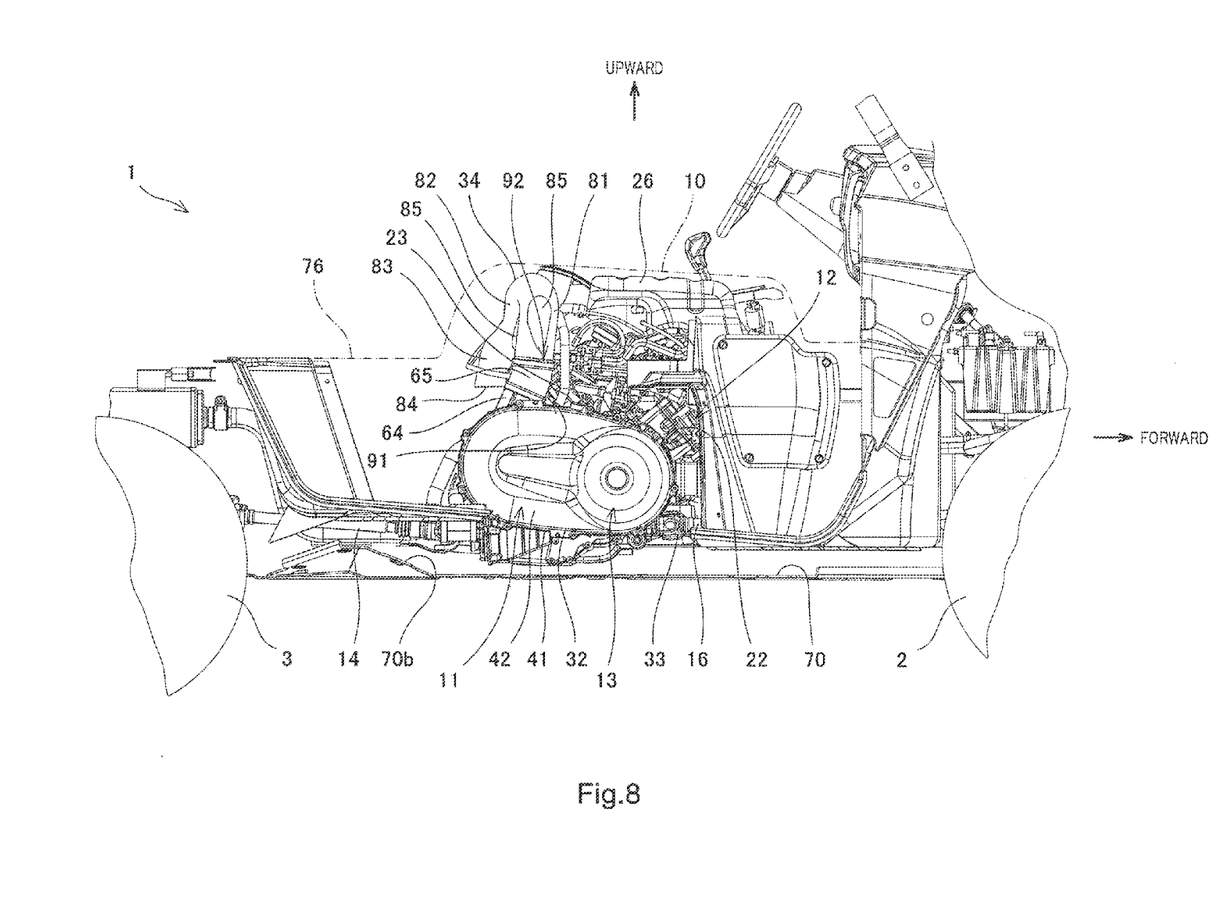
FIG. 8 is a right side view of the utility vehicle, showing a state in which a part of the components such as the console box are omitted.

As shown in FIG. 8, the air-intake chamber 26 extends in the forward and rearward direction so as to overlap with the front cylinder 22 and the rear cylinder 23 when viewed from above, to supply the air to the front cylinder 22 and to the rear cylinder 23. The front cylinder 22 and the rear cylinder 23 extend to form a V-shape, from a portion of the crankcase 21 to which the crankshaft 51 (see FIG. 3) is rotatably mounted. As described above, the portion of the crankcase 21 (see FIG. 3) which is rearward relative to the portion of the crankcase 21 to which the crankshaft 51 (see FIG. 3) is rotatably mounted, constitutes the second transmission chamber 48 (see FIG. 3). Thus, a dead space is formed above the rear portion of the crankcase 21 and rearward relative to the rear cylinder 23. In addition, a dead space is formed above the rear cylinder 23 and rearward relative to the air-intake chamber 26.

The rear portion of the transmission case assembly 32 is joined to the rear portion of the crankcase 21. The air discharge duct 34 is coupled to the rear tubular portion 64 extending upward from the rear upper portion of the transmission case body 41 such that the rear tubular portion 64 is tilted slightly forward, extends substantially upward from the rear tubular portion 64, and is bent back above the engine 12. In this way, the air discharge duct 34 can be laid out in the dead space.

Figure 7:
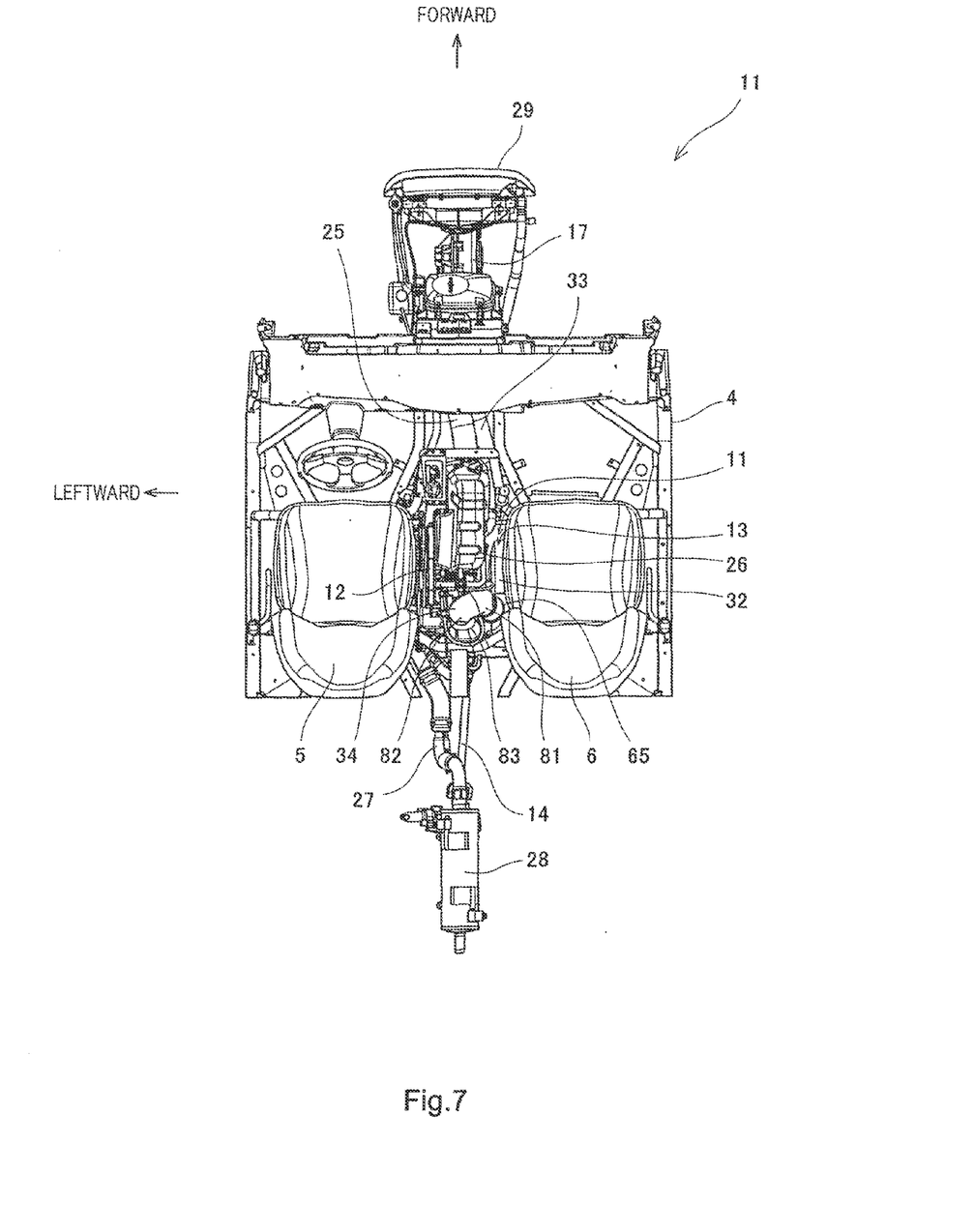
FIG. 7 is a plan view of the utility vehicle, showing a state in which a part of the components such as the console box are omitted.

As shown in FIGS. 6 and 7, the lower end portion of the upward extending portion 81 is offset in the rightward and leftward direction and in the forward and rearward direction relative to the lower end portion of the downward extending portion 82. The lower end portion of the downward extending portion 82 is disposed rearward and leftward relative to the lower end portion of the upward extending portion 81. The lower end portion of the upward extending portion 81 is positioned to vertically overlap with the transmission case assembly 32 constituting the right part of the engine unit 11. Because of this, the lower end portion 83 of the downward extending portion 82 is positioned closer to the engine 12 than the upward extending portion 81. Thus, the dead space can be utilized efficiently.

As shown in FIG. 8, the upward extending portion 81 and the downward extending portion 82 partially overlap with each other in the forward and rearward direction. As shown in FIG. 9, the upward extending portion 81 and the downward extending portion 82 also partially overlap with each other in the rightward and leftward direction. Since the upward extending portion 81 and the downward extending portion 82 partially overlap with each other in the rightward and leftward direction and in the forward and rearward direction in this way, a projecting area of the air discharge duct 34 when viewed from above can be made as small as possible, and the air discharge duct 34 can be laid out compactly when viewed from above, as shown in FIG. 7. Note that the air discharge duct 34 can be laid out compactly, so long as the upward extending portion 81 and the downward extending portion 82 partially overlap with each other in at least either the rightward and leftward direction or in the forward and rearward direction. Nonetheless, if the upward extending portion 81 and the downward extending portion 82 partially overlap with each other in the rightward and leftward direction and in the forward and rearward direction, the air discharge duct 34 can be laid out more compactly.

The portion from the upward extending portion 81 to the downward extending portion 82 has an inverted-U-shape having a great curvature so that the downward extending portion 82 is not far from the upward extending portion 81 when viewed from above. Thus, the air discharge duct 34 has a hair-pin shape. The lower end portion 83 of the downward extending portion 82 is curved slightly rearward and then is curved downward again. A substantial portion, indeed most, of the air discharge duct 34 has a substantially circular cross-section, while the lower end portion 83 of the downward extending portion 82 has a cross-section of an elongated circle which has a short axis in the forward and rearward direction and a long axis in the rightward and leftward direction. This allows the downward extending portion 82 to be positioned closer to the upward extending portion 81 in the forward and rearward direction. Since the portion from the upward extending portion 81 to the downward extending portion 82, and the lower end portion 83 of the downward extending portion 82 are shaped in this way, the upward extending portion 81 and the downward extending portion 82 can partially overlap with each other in the rightward and leftward direction and in the forward and rearward direction as described above.

As shown in FIG. 8, because of the above lay out of the air discharge duct 34, the upper end portion (bent portion) of the air discharge duct 34 can be laid out immediately rearward relative to the air-intake chamber 26. The air-intake chamber 26 and the air discharge duct 34 are accommodated into the console box 10 such that their upper end portions are below the upper surface of the console box 10. As described above, the console box 10 swells to a higher position than the bottom portion of the front seat 5 and the bottom portion of the front seat 6 (see FIG. 1). The upper end portion of the air discharge duct 34 is positioned in close proximity to the inner surface of the upper wall of the console box 10. Since the air discharge duct 34 is accommodated into the console box 10 in this way, the air discharge duct 34 can be positioned as high as possible, but the space for the passenger is not restricted. Note that the air discharge duct 34 has a plurality of dented portions 85 to avert interference between the outer surface of the air discharge duct 34 and the inner surface of the console box 10.

The air discharge duct 34 is accommodated into the rear end portion of the console box 10. The upward extending portion 81 extends upward such that it is tilted slightly forward along an axial direction of the rear tubular portion 64. Because of this, the downward extending portion 82 extends substantially straight downward from the upper end portion such that the downward extending portion 82 overlaps with the upward extending portion 81. Since the downward extending portion 82 can extend substantially straight downward, a level difference between the rear end portion of the console box 10 and the front end portion of the rear tunnel 76 can be made lessened in the forward and rearward direction.

The outlet 84 faces the rear tunnel 76. The air from inside the air discharge duct 34 flows through the rear tunnel 76 and is discharged to outside. As described above, the air from the cooling fan (not shown) flows to the front end portion of the rear tunnel 76. The air discharged through the outlet 84 flows rearward inside the rear tunnel 76 along with the air from the cooling fan. The air discharged through the outlet 84 is prevented from blowing to the passengers seated on the rear seats 7 and 8, respectively.

The air discharge duct 34 is coupled to the transmission case assembly 32 via the coupling duct 65. The coupling duct 65 is manufactured using an elastic material such as rubber or synthetic resin. Because of this, the coupling duct 65 can be elastically coupled to the rear tubular portion 64 sealingly without an air leakage. Therefore, it is possible to substantially prevent the water from directly flowing into the transmission case assembly 32 through the rear tubular portion 64. In addition, the coupling duct 65 can attenuate a vibration of the air discharge duct 34. Therefore, even in a configuration in which the air discharge duct 34 is positioned in close proximity to the inner surface of the console box 10, it is possible to prevent the air discharge duct 34 from vibrating and thereby interfering with the inner surface of the console box 10. Therefore, it is possible to suppress a noise from being generated inside the console box 10 during driving, regardless of the configuration in which the air discharge duct 34 is positioned as high as possible.

The lower end portion of the coupling duct 65 is joined to the rear tubular portion 64 in a state where the lower end portion of the coupling duct 65 is positioned with respect to the rear tubular portion 64 in a circumferential direction thereof by a first positioning member 91. The upper end portion of the coupling duct 65 is joined to the lower end portion of the upward extending portion 81 in a state where the upper end portion of the coupling duct 65 is positioned with respect to the lower end portion of the upward extending portion 81 in a circumferential direction thereof, by a second positioning member 92. The first positioning member 91 includes, for example, a projection provided at one of the coupling duct and the end portion of the rear tubular portion and a slit formed at the other end portion. By inserting the projection into the slit, the coupling duct is positioned with respect to the rear tubular portion. The second positioning member 92 is configured like the first positioning member 91. Thus, the air discharge duct 34 is positioned with respect to the transmission case assembly 32 in a circumferential direction thereof. Since the air discharge duct 34 includes the upward extending portion 81 and the downward extending portion 82 which extend substantially vertically, it is possible to suppress the air discharge duct 34 from being displaced with respect to the transmission case assembly 32 in the rightward and leftward direction and in the forward and rearward direction. Because of this, it is possible to prevent the air discharge duct 34 from interfering with the console box 10, the rear tunnel 76, the air-intake chamber 26, and the engine 12, even in a state where the air discharge duct 34 is laid out in close proximity to these components.

The air-cooling structure of the transmission of the above embodiment may be applied to vehicles such as ATVs (all terrain vehicles), or two-wheeled vehicles, for example, as well as the utility vehicle. These vehicles may be hybrid vehicles or electric (power-driven) vehicles, as well as vehicles driven by a gasoline engine.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle, comprising:
a transmission including a transmission mechanism and a transmission case assembly for accommodating the transmission mechanism;
an air discharge duct coupled to the transmission case assembly to discharge air from inside the transmission case assembly;
seats arranged side by side in a rightward and leftward direction; and
a center console disposed between the seats such that the center console swells upward to be higher than bottom portions of the seats,
wherein the air discharge duct includes an upward extending portion extending substantially upward from the transmission case assembly, and a downward extending portion which is bent back at an upper end portion of the upward extending portion, and then extends substantially downward;
the upward extending portion and the downward extending portion partially overlap each other in both of a forward and rearward direction and the rightward and leftward direction; and
the upper end portion of the air discharge duct protrudes upward to be higher than the bottom portions of the seats and is accommodated into the center console,
wherein the transmission mechanism includes a drive pulley assembly mounted to a drive shaft coupled to a crankshaft, a driven pulley assembly mounted to a driven shaft positioned rearward relative to the drive shaft, and a belt wrapped around the drive pulley assembly and the driven pulley assembly;
the transmission further includes a centrifugal fan mounted to the drive shaft and accommodated into the transmission case assembly;
the transmission case assembly has an air inlet through which air from outside is taken into the transmission case assembly, and an air outlet through which the air is discharged from inside the transmission case assembly;
the air inlet is provided at a front portion of the transmission case assembly to face the centrifugal fan;
the air outlet is constituted by a tubular portion provided at a rear upper portion of the transmission case assembly;
the tubular portion is positioned to face the driven pulley assembly and extends upward from the transmission case assembly such that the tubular portion is tilted forward; and
a lower end portion of the upward extending portion is coupled to the tubular portion.

2. The utility vehicle according to claim 1, wherein an uppermost end of the air discharge duct is positioned higher than an uppermost end of a cylinder head of an engine.

3. The utility vehicle according to claim 1, wherein the seats include right and left front seats and right and left rear seats;
the center console is positioned between the right and left front seats;
a floor panel is positioned between the right and left rear seats and is provided with a rear tunnel extending continuously with the center console; and
the downward extending portion has an outlet at a lower end portion thereof, the outlet facing the rear tunnel.

4. The utility vehicle according to claim 1, wherein the downward extending portion is positioned closer to an engine than the upward extending portion; and
the air discharge duct is bent back above the engine.

5. The utility vehicle according to claim 1, wherein the lower end portion of the upward extending portion is coupled to the tubular portion via a coupling duct formed of an elastic material.

6. The utility vehicle according to claim 5, further comprising:
- a first positioning portion for positioning the coupling duct with respect to the tubular portion in a circumferential direction; and
- a second positioning portion for positioning the upward extending portion with respect to the coupling duct in a circumferential direction.

* * * * *